(12) United States Patent
Arder

(10) Patent No.: US 9,989,781 B2
(45) Date of Patent: Jun. 5, 2018

(54) EYEGLASSES WITH DETACHABLE TEMPLES AND NOSE GRIP AND METHOD OF USE

(71) Applicant: Pamela Arder, Imperial, PA (US)

(72) Inventor: Pamela Arder, Imperial, PA (US)

( * ) Notice: Subject to any disclaimer, the term of this patent is extended or adjusted under 35 U.S.C. 154(b) by 271 days.

(21) Appl. No.: 15/093,772

(22) Filed: Apr. 8, 2016

(65) Prior Publication Data

US 2017/0293157 A1    Oct. 12, 2017

(51) Int. Cl.
*G02C 5/14* (2006.01)
*G02C 5/22* (2006.01)
*G02C 5/12* (2006.01)

(52) U.S. Cl.
CPC ............ *G02C 5/146* (2013.01); *G02C 5/122* (2013.01); *G02C 5/22* (2013.01); *G02C 5/2209* (2013.01); *G02C 2200/02* (2013.01); *G02C 2200/08* (2013.01); *G02C 2200/16* (2013.01)

(58) Field of Classification Search
CPC .......... G02C 5/143; G02C 5/146; G02C 5/22
USPC ................ 351/116, 121, 112, 113; D16/321; 16/228
See application file for complete search history.

(56) References Cited

U.S. PATENT DOCUMENTS

| | | | | |
|---|---|---|---|---|
| 4,153,347 A * | 5/1979 | Myer | ........................ | G02C 1/08 351/121 |
| 4,978,209 A * | 12/1990 | Ohba | ..................... | G02C 5/008 351/113 |
| 5,359,370 A * | 10/1994 | Mugnier | ................. | G02C 5/126 351/111 |
| 5,426,473 A * | 6/1995 | Riehm | ..................... | A61F 9/026 351/121 |
| 5,793,464 A * | 8/1998 | Chen | ......................... | G02C 5/10 351/121 |
| 6,568,805 B1 * | 5/2003 | Dietz | ........................ | G02C 3/04 351/112 |
| 6,834,952 B2 * | 12/2004 | Polovin | ..................... | G02C 5/10 351/111 |
| 6,942,338 B2 * | 9/2005 | Ku | .......................... | G02C 5/146 351/153 |
| 7,121,663 B1 * | 10/2006 | Huang | .................... | G02C 5/008 351/153 |
| 7,645,040 B2 * | 1/2010 | Habermann | ............. | G02C 1/08 351/153 |
| 7,744,212 B2 * | 6/2010 | Panisset | ............... | G02C 5/2209 351/116 |
| 8,944,591 B2 * | 2/2015 | Li | ........................... | G02C 3/003 351/116 |
| 2017/0192249 A1 * | 7/2017 | Saccardo | ................. | G02C 5/22 |

* cited by examiner

*Primary Examiner* — Zachary Wilkes
(74) *Attorney, Agent, or Firm* — Gwen R. Acker Wood; Acker Wood IP Law

(57) ABSTRACT

The present invention provides an eyeglasses system and method of use comprising a frame, a temple attachment assembly positioned on the ends of the frame, detachable temples having a hollow member extending therefrom for attachment to the temple attachment assembly, and a bridge nose grip assembly so as to allow a wearer to detach a temple from one side of the frame and to wear the eyeglasses comfortably, securely and without movement of the eyeglasses while reclining on the same side as the detached temple.

10 Claims, 5 Drawing Sheets

EYEGLASSES WITH DETACHABLE TEMPLES AND NOSE GRIP AND METHOD OF USE

FIELD OF THE INVENTION

The present invention relates to eyeglasses and, in particular, to an eyeglasses system having detachable temples and a nose grip meant to be worn with only one attached temple to allow a wearer to wear the eyeglasses comfortably, securely and without movement of the eyeglasses while the wearer reclines on his/her side.

BACKGROUND OF THE INVENTION

Most conventional eyeglasses have temples secured to frames via screws to prevent detachment of the temples from the frame. Such eyeglasses typically include a frame having a lens enclosure and a pair of temples each having pivotal members secured to a pair of hinges located at the ends of the frames by screws which fit through holes in the pivotal members and the hinges, thus preventing the temples from detaching from the frame.

Eyeglasses have been developed with alternate attachment means of the temples to the frame which allow detachment of the temples from the frame. For example, U.S. Pat. No. 5,418,581 discloses an eyewear hinge system which includes a "T"-shaped hinge connected to a frame via a connecting element or incorporated into the frame, a vertical post, and a receiving member attached to a temple having two curved fingers for receiving the vertical post, which permits replacing the frame or the temples. U.S. Pat. No. 6,217,170 discloses a magnetic coupling system similar to conventional eyeglasses which includes magnets instead of screws for securing temples to a frame. None of the prior art, however, discloses eyeglasses which are meant to be worn with only one attached temple and yet remain securely in place without movement and are comfortable on a wearer while the wearer reclines on his/her side.

SUMMARY OF THE INVENTION

The present invention provides an eyeglasses system and methods of use which allows a wearer to wear the eyeglasses with only one temple attached and yet remain secure, comfortable and without movement of the eyeglasses on their face while the wearer reclines on one side.

In an aspect of the invention, there is provided an eyeglasses system comprising a frame having a front side and a back side, the frame comprised of two lens enclosures, each of the two lens enclosures having an upper end, a lower end, an outer end and an inner end, the inner ends spaced apart to define a center opening there between; a bridge connecting the two lens enclosures at their upper ends; a pair of temples, each temple having a first end and a second end; and a temple attachment assembly located on each of the outer ends of the lens enclosures on the back side of the frame, the temple attachment assembly oriented perpendicular to the frame's long axis.

The temple attachment assembly comprises a first solid member and a second solid member spaced apart from one another defining a recess there between, the first solid member having a width and a length that is smaller than the width and the length of the second solid member, the first and second solid members having an equal depth, both solid members having an outer surface and an inner surface with the inner surfaces of the solid members oriented horizontal to one another, the inner surface of each of the solid members having a convex shape and comprised of two vertical walls of equal width and length and tangential to one another.

The eyeglasses system also includes a hollow member attached to the first end of each of the temples, the hollow member having a width and length that is greater than the first solid member and a width and a length that is smaller than the second solid member. The hollow member is configured to fit securely into the recess between the first and second solid rectangular members past the two vertical walls, so that each of the temples can move inwardly towards the center of the frame by way of the hollow member fitting around the first solid member and pivoting inwardly. Each of the temples are prevented from moving outwardly away from the center of the frame by the second solid member, due to the greater width and length compared to the width and length of the hollow member.

The eyeglasses system further includes a nose grip assembly comprising a generally U-shaped member having an upper section and two downwardly facing nose grip arms, the upper section attached to the lower end of the bridge and the upper portion of each of the nose grip arms attached to each of the inner ends of the lens enclosures. Each of the nose grip arms has an outer surface facing towards each of the lens enclosures and an inner surface facing towards the center opening. Each of the nose grip arms has an indentation in its outer surface, so that each of the nose grip arms are configured to grip each side of a nose of a wearer comfortably and securely. Located on each of the inner ends of the lens enclosures is a tab for receiving each of the indentations on the nose grip arms for securing the nose grips in place.

In another aspect of the invention, there is provided a method for wearing the eyeglasses system described above with one attached temple while a wearer is reclining on one's side. The method comprises a wearer deciding which side the wearer wants to recline; detaching one of the pair of temples on the same side of the eyeglasses as the side the wearer wants to recline; placing the eyeglasses on the wearer; pressing each one of the nose grip arms on each side of the wearer's nose; and reclining on the side the wearer has decided, wherein the eyeglasses with only one attached temple are comfortable, secure and immobile on the face of the wearer.

BRIEF DESCRIPTION OF THE DRAWINGS

A fuller understanding of the invention can be gained from the following description when read in conjunction with the accompanying figures, where like reference numerals refer to identical or functionally similar elements throughout the separate views, which illustrate some, but not the only and exclusive, examples of embodiments of the invention and, as such, the figures disclosed herein are to be considered illustrative rather than limiting. In the drawings.

DETAILED DESCRIPTION OF THE INVENTION

As used herein, the terms "eyeglasses system" and "eyeglasses" are meant to be interchangeable.

As used herein, the terms "frame" and "two lens enclosures" are meant to be interchangeable.

Figure 1:
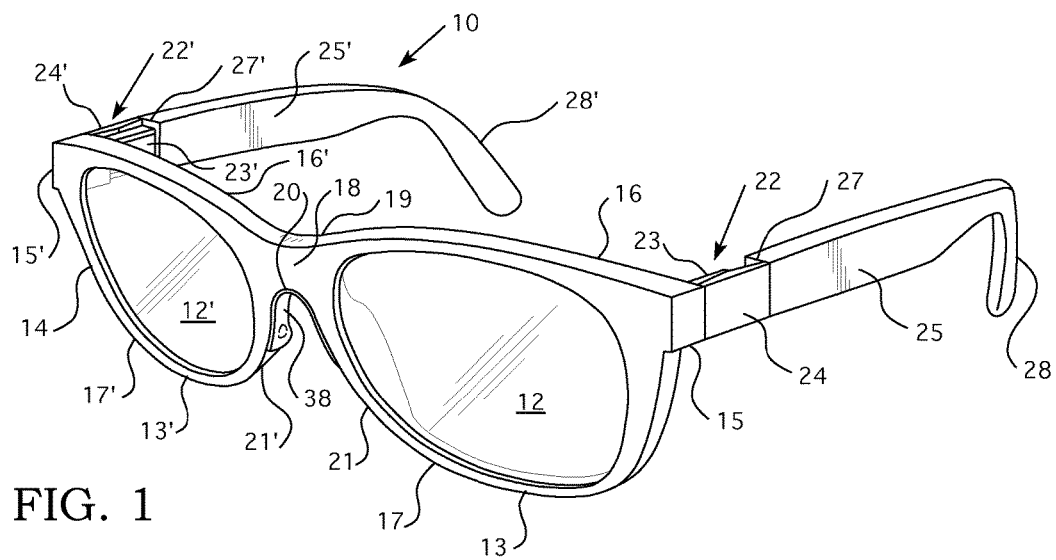
FIG. 1 is a front perspective view of the eyeglasses system with two temples attached and oriented perpendicular to the long axis of the frame (i.e., in an open position), in accordance with an embodiment of the invention.
Figure 2:
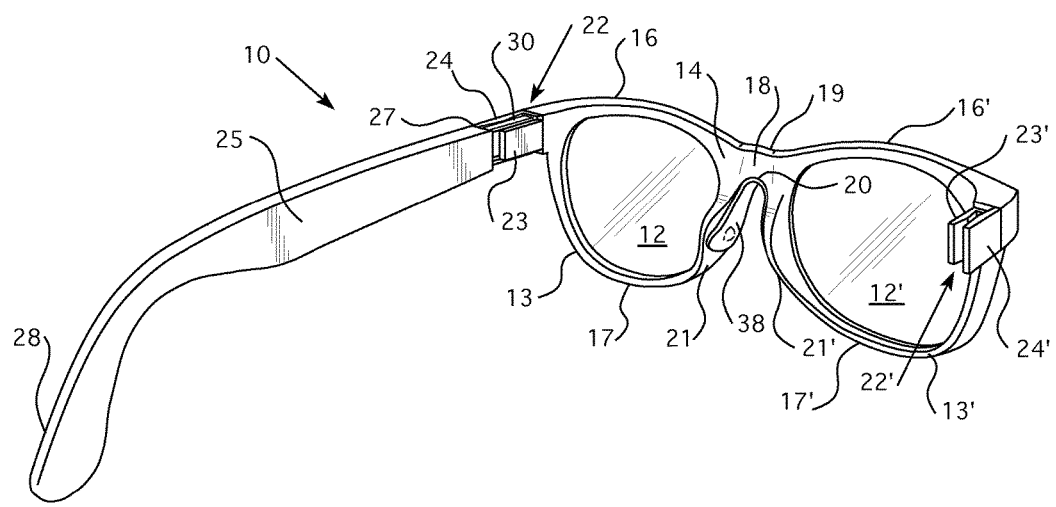
FIG. 2 is a front perspective view of the eyeglasses system with one temple attached and oriented perpendicular to the long axis of the frame (i.e., in an open position), in accordance with an embodiment of the invention.
Figure 3:
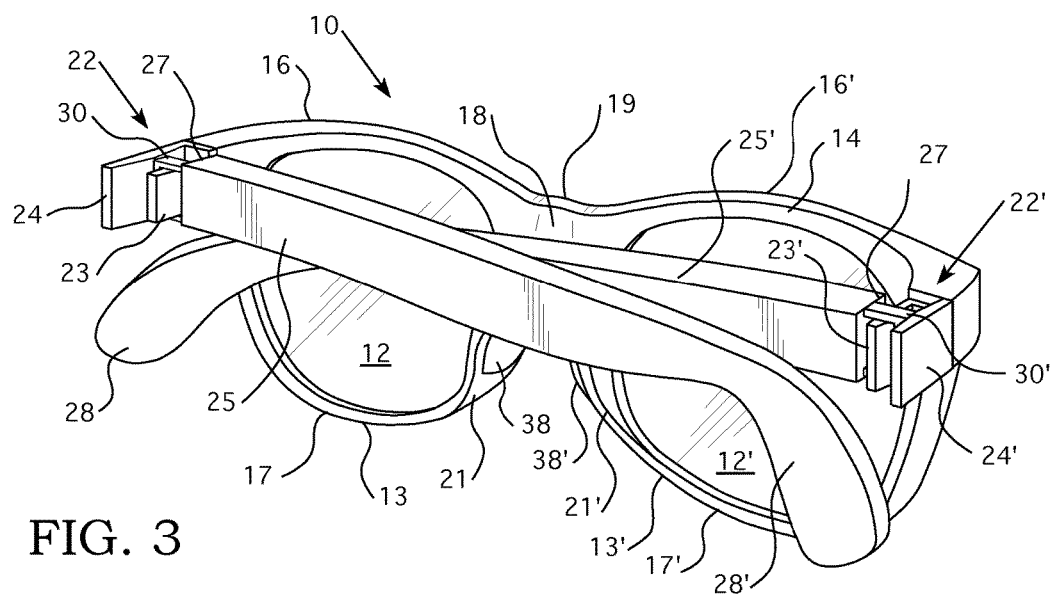
FIG. 3 is a back perspective view of the eyeglasses system with two temples attached and oriented parallel to the long axis of the frame (i.e., in a closed position), in accordance with an embodiment of the invention.

The eyeglasses system of the present invention is shown in FIGS. 1-9. As shown in FIGS. 1-3, the eyeglasses system 10 includes a frame 14 comprised of two lens enclosures 13, 13' having an upper end 16, 16', a lower end, 17, 17', an outer end 15, 15' and an inner end 21, 21', each lens enclosure 13, 13' configured to contain a lens 12, 12' therein, said inner ends 21, 21' spaced apart to define a center opening there between 26; a pair of temples 25, 25' having a first end 27 and a second end 28; a bridge 18 having an upper end 19 and a lower end 20 which connects the two lens enclosures 13, 13' at their upper ends 16, 16'; a first and second temple attachment assembly 22, 22' each located at the outer ends 15, 15' of the lens enclosures 13, 13' on the back of the frame 14, and oriented perpendicularly with respect to the frame's long axis.

Figure 4:
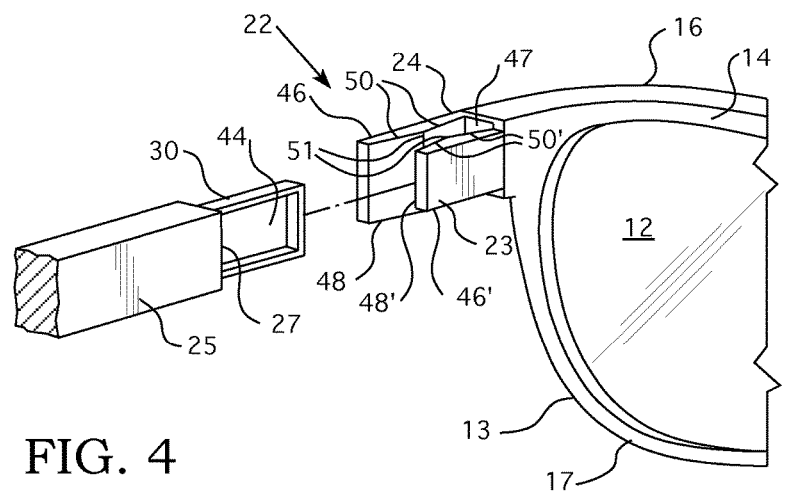
FIG. 4 is an expanded partial back perspective view of one lens enclosure of the frame showing the temple attachment assembly and a temple with a hollow member extending therefrom, in accordance with an embodiment of the invention.
Figure 5:
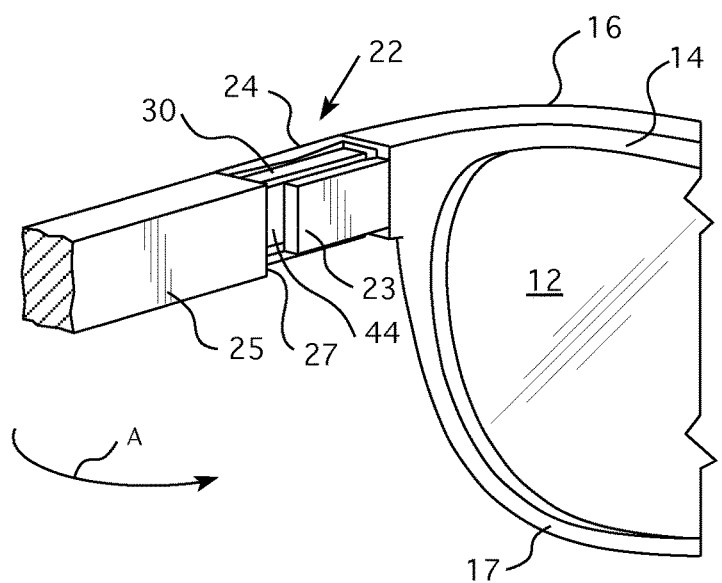
FIG. 5 is an expanded partial back perspective view of one lens enclosure of the frame showing the temple attachment assembly with the hollow member inserted all the way in the temple attachment assembly recess, with the temple in an open position, in accordance with an embodiment of the invention.
Figure 6:
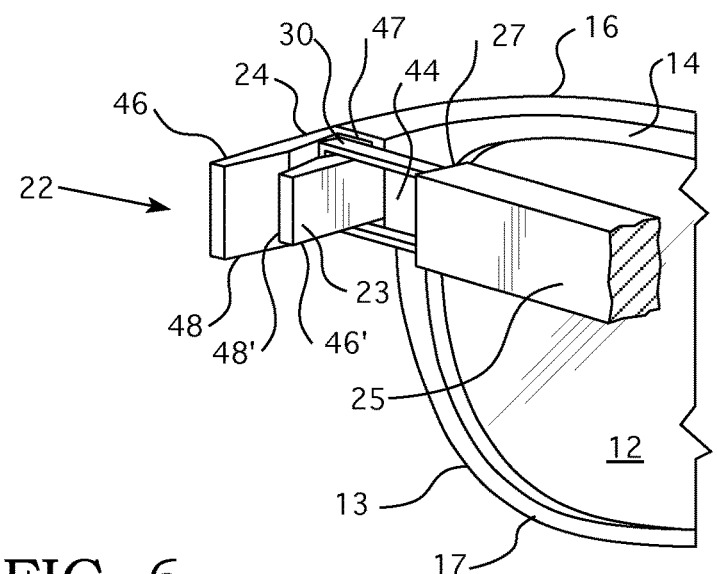
FIG. 6 is an expanded partial back perspective view of one lens enclosure of the frame showing the temple attachment assembly with the hollow member inserted all the way inside the temple attachment assembly recess, with the temple pivoted in a closed position, in accordance with an embodiment of the invention.

Referring now to FIGS. 4-6, the temple attachment assembly 22 comprises a first solid member 23 and a second solid member 24, both having an outer surface 46, 46' and an inner surface 48, 48'. The solid members 23, 24 are spaced apart from one another defining a recess there between 47. The first solid member 23 has a width and a length that is smaller than the width and the length of the second solid member 24, with both solid members 23, 24 having an equal depth. The inner surfaces 48, 48' of the solid members 23, 24 are positioned horizontal to one another on the back of the frame 14. The inner surface 48, 48' of each of the solid members 23, 24 has a convex shape, with the inner surfaces 48, 48' comprised of two vertical walls 50, 50' of equal width and length tangential to one another (i.e., each forming an obtuse angle within the recess 47; best seen in FIG. 4). Thus, the tangential walls 50, 50' form two narrowings 51 in the recess 47 of the solid members 23, 24

The temple attachment assembly 22 is configured to easily attach to and detach from a first end 27 of a temple 25, the first end 27 of the temple 25 having a hollow member 30 attached thereto and extending therefrom. As shown in FIGS. 4-5, the hollow member 30 has a width and a length that is greater than the first solid member 23 and a width and a length that is smaller than the second solid member 24. The hollow member 30 has a depth equal to the depth of the first and second solid members 23, 24. Secure and easy attachment of the temple 25 to the frame 14 is accomplished by inserting the hollow member 30 all the way into the recess 47 between the two solid members 23, 24 and past the two narrowings 51 formed by the tangential vertical walls 50, 50' of the solid members 23, 24, with the back side of the frame 14 serving as a positive stop (best seen in FIG. 5). Detachment of the temple 25 is accomplished by holding the frame 14 and pulling gently on the temple 25 away from the frame 14 so that the hollow member 30 moves past the two narrowings 51 in the recess 47.

FIGS. 1-2, 5 and 9 show the eyeglasses with one (FIGS. 2 and 5) or both (FIG. 1) temples 25, 25' attached and the one or both temples 25, 25' oriented perpendicularly with respect to the long axis of the frame 14, i.e., in an open position. As shown in FIGS. 3 and 6, moving the temples 25, 25' in an inwardly direction i.e., to a closed position, shown as "A" in FIG. 5, causes the hollow members 30, 30' to fit completely over the first solid members 23, 23'. The temples 25, 25' are prevented from moving in an outwardly direction due to the greater width and length of the second solid member 24, 24' compared to the width and length of the hollow member 30, 30'.

In an embodiment of the invention, each of the temples 25, 25' contain a low or medium strength magnet (not shown) halfway between the first end and the second end of the temples to so that when one temple is detached, the detached temple may be placed atop the attached temple and be affixed thereto so that the detached temple is not misplaced or lost by wearer. Any suitable low or medium strength magnet may be used for incorporation into the body of the temples, including, without limitation, injection-molded magnets, which are made of a mixture of magnetic material with a polymer binder, such as nylon or polyphenylene sulfide (PPS). When both temples are attached to the frame and in a closed position, the two temples will be magnetically attracted to one another, but the level of magnetic attraction will not impede pivoting the temples to an open position, nor will it cause the temples to automatically close when in an opened position.

As shown in the FIGS. 1-6 and 9, the solid members 23, 24 and the hollow member 30 are rectangular in shape. However, the invention encompasses solid members 23, 24 and hollow members 30, 30' that are ovoid or circular, so long as the first solid member 23 is smaller than the second solid member 24, and the hollow member 30 is larger than the first solid member 23 and smaller than the second solid member 24.

Figure 7:
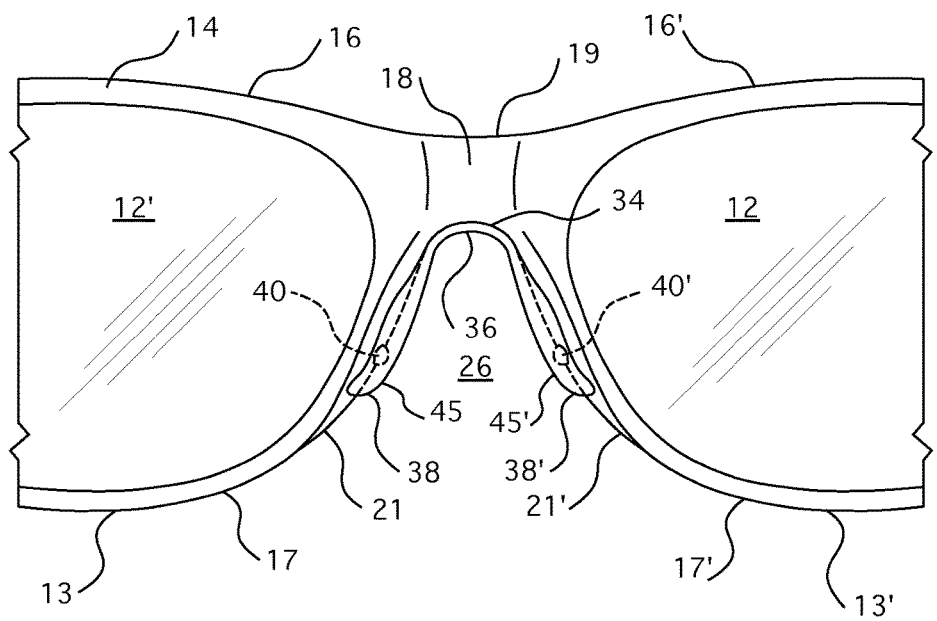
FIG. 7 is an expanded partial front view of the eyeglasses system showing the nose grip assembly with both nose grip arms secured onto tabs on the frame, in accordance with an embodiment of the invention.
Figure 8:
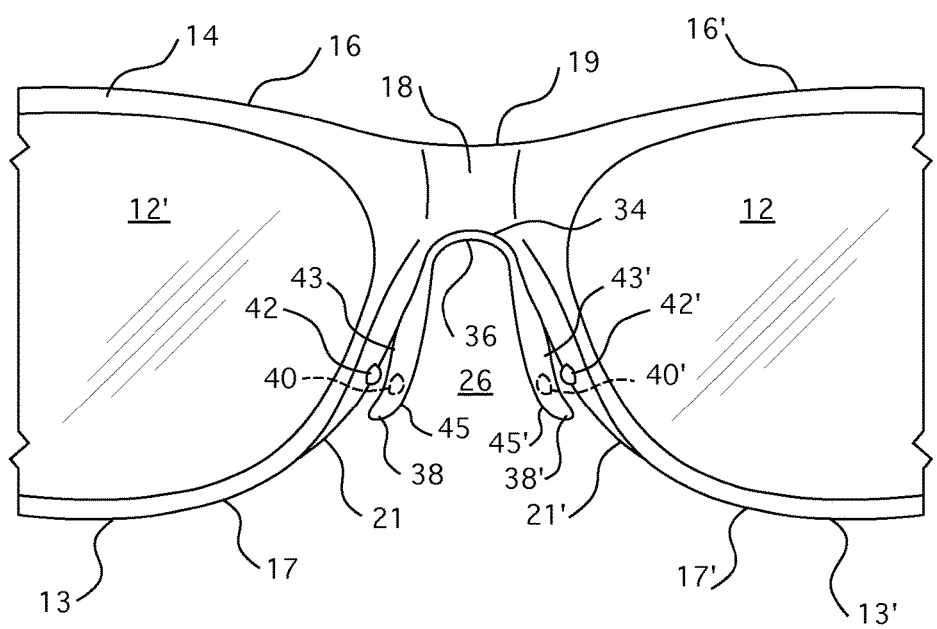
FIG. 8 is an expanded partial front view of the eyeglasses system showing the nose grip assembly with both nose grip arms separated from the tabs on the frame, in accordance with an embodiment of the invention; an FIG. 9 is a perspective view of the eyeglasses system being worn on the face of a wearer reclining on the wearer's left side with the left-side temple detached and nose grips placed on each side of the wearer's nose, in accordance with an embodiment of the invention.

As shown in FIGS. 7-8, the eyeglasses system 10 also includes a nose grip assembly 34 comprising a generally U-shaped member having an upper section 36 and two downwardly facing nose grip arms 38, 38' which extend about 10 mm to about 20 mm down from the lower end 20 of the bridge 18. The upper section 36 is attached to the lower end 20 of the bridge 18 and each of the nose grip arms 38, 38' are attached at their upper portion to each of the inner ends 21, 21' of the lens enclosures 13, 13'. Each of the nose grip arms 38, 38' has an outer surface 43, 43' facing towards each of the lens enclosures 13, 13' and an inner surface 45, 45' facing towards the center opening 26. The nose grip arms 38, 38' are configured to grip each side of a wearer's nose so as to keep the eyeglasses securely in place when only one temple is attached to the frame 14 (shown in FIG. 9).

Each of the nose grip arms 38, 38' has an indentation 40, 40' on its outer surface 43, 43'. Located on each of the inner ends 21, 21' of the lens enclosures 13, 13' is a tab 42, 42' for receiving each of the indentations 40, 40' on the nose grip arms for securing the nose grips arms 40, 40' in place when not in use.

The frame 14, temple attachment assembly 22, 22' and temples 25, 25' with hollow members 25, 25' of the invention can be made from any suitable material used in the eyewear industry including, but not limited to, plastic such as cellulose acetate, cellulose acetate propionate and blended nylon; metals such as titanium, beryllium, stainless steel, copper, nickel, aluminum and alloys thereof; wood; or bone. In an embodiment, the frame 14, temple attachment assemblies 22, 22' and temples 25, 25' with hollow members 30, 30' are made from the same material. In another embodiment, the frame 14, temple attachment assemblies 22, 22' and temples 25, 25' with hollow members 30, 30' need not all be made of the same material. In a non-limiting example, the invention encompasses an eyeglasses system 10 where the frame 14 and the temples 25, 25' are made of plastic, and the temple attachment assemblies 22, 22' and hollow members 30, 30' are made of metal. In another non-limiting example, the invention encompasses an eyeglasses system 10 where the frame 14 and the temples 25, 25' are made of wood, and the temple attachment assemblies 22, 22' and hollow members 30, 30' are made of metal.

The nose grip assembly 34 is made from any suitable material that is moldable and adherent to skin and include, without limitation, moldable polymers such as silicone rubber, natural rubbers and the like.

Figure 9:
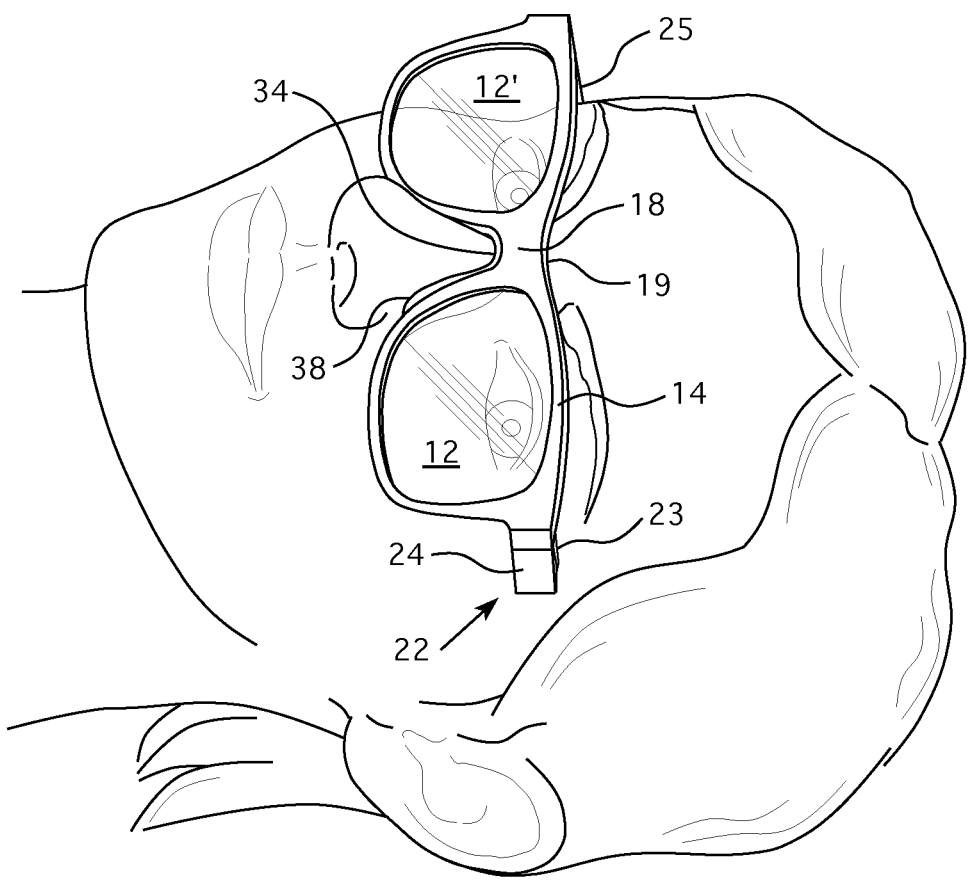

In use, as shown in FIG. 9, a wearer is able to wear the eyeglasses 10 of the invention easily, comfortably and securely while reclining on one's side (e.g., while watching television, reading a book, or just resting), due to the detachability of each of the temples 25 and the nose grip assembly 34. For example, when a wearer wants to wear their eyeglasses 10 to read a book in bed while reclining on one's side, they need only to detach the temple 25 on the side that the wearer wishes to recline, put the eyeglasses 10 on, and secure the eyeglasses 10 in place by pressing the nose grip arms 38, 38' on their nose. The wearer then is able to recline comfortably on their side without lying on an attached temple (which typically would cause the eyeglasses to become askew and possibly deform or break the temples or the frame), and at the same time have the eyeglasses 10 remain securely in place by the nose grip arms 38, 38'.

The eyeglasses system 10 of the invention can be especially useful for patient's in hospitals or being cared for at home who wear corrective eyeglasses and find it uncomfortable or are unable to lie on their backs and thus need to lie on their sides and would like to read or watch television without difficulty.

While the invention has been particularly shown and described with reference to embodiments described above, it will be understood by those skilled in the art that various alterations in form and detail may be made therein without departing from the spirit and scope of the invention, as defined by the appended claims.

What is claimed is:

1. An eyeglasses system, comprising:
    a frame having a front side and a back side, said frame comprised of two lens enclosures, each of said lens enclosures having an upper end, a lower end, an outer end and an inner end, said inner ends spaced apart to define an opening there between;
    a bridge connecting the two lens enclosures at their upper ends;
    a pair of temples, each of said pair of temples having a first end and a second end;
    a temple attachment assembly located on each of the outer ends of the lens enclosures on the back side of the frame, said temple attachment assembly oriented perpendicular to a long axis of the frame and comprising:
        a first solid member and a second solid member spaced apart from one another defining a recess there between, said first solid member having a width and a length that is smaller than the width and the length of the second solid member, said first and second solid members having an equal depth, both solid members having an outer surface and an inner surface with the inner surfaces of the solid members oriented horizontal to one another, the inner surface of each of the solid members having a convex shape comprised of two walls of equal width and length, the two walls forming an obtuse angle within the recess; and
        a hollow member attached to the first end of each of the temples, said hollow member having a width and length that is greater than the first solid member and a width and a length that is smaller than the second solid member, said hollow member configured to fit securely into the recess between the first and second solid members and past the two walls of the first and second solid members, wherein each of the temples can move inwardly towards a center of the frame by way of the hollow member fitting around the first solid member and pivoting inwardly, wherein each of the temples are prevented from moving outwardly away from the center of the frame by way of the greater width and length of the second solid member compared to the width and length of the rectangular hollow member.

2. The eyeglasses system of claim 1, further comprising a nose grip assembly comprising a generally U-shaped member having an upper section and two downwardly facing arms, said upper section attached to the lower end of the bridge, and upper portion of each of said arms attached to each of the inner ends of the lens enclosures, each of said arms having an outer surface facing towards each of the lens enclosures and an inner surface facing towards the opening, wherein each of the nose grip arms are configured to grip each side of a nose of a wearer comfortably and securely.

3. The eyeglasses system of claim 2, wherein the nose grip assembly is manufactured from moldable polymeric materials selected from the group consisting of silicone rubber and natural rubbers.

4. The eyeglasses system of claim 2, wherein the outer surface of each of the nose grip arms has an indention therein.

5. The eyeglasses system of claim 4, wherein each of the inner ends of the lens enclosures has a tab thereon for receiving each of the indentations on the nose grip arms to secure the nose grip arms in place.

6. The eyeglasses system of claim 2, wherein the nose grip arms each extend down about 10 mm to about 20 mm from the lower end of the bridge.

7. The eyeglasses system of claim 1, wherein the shape of the temple attachment assembly and the shape of the hollow member are the same and is selected from the group consisting of rectangular, circular and ovoid.

8. The eyeglasses system of claim 1, wherein the frame, temple attachment assembly and pair of temples with hollow members are made from materials selected from the group consisting of plastic selected from cellulose acetate, cellulose acetate propionate and blended nylon; metals selected from titanium, beryllium, stainless steel, copper, nickel, aluminum and alloys thereof; wood and bone.

9. The eyeglasses system of claim 8, wherein the frame, temple attachment assembly and pair of temples with hollow members are made from the same materials.

10. The eyeglasses system of claim 8, wherein the frame and pair of temples are made from different materials than the temple attachment assembly and hollow member.

\* \* \* \* \*